United States Patent
Hamilton et al.

(10) Patent No.: US 7,401,093 B1
(45) Date of Patent: ***Jul. 15, 2008

(54) SYSTEM AND METHOD FOR MANAGING FILE DATA DURING CONSISTENCY POINTS

(75) Inventors: Eric Hamilton, Durham, NC (US);
Jeffrey S. Kimmel, Chapel Hill, NC (US); Robert L. Fair, Cary, NC (US);
Ashish Prakash, Morrisville, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 10/705,493

(22) Filed: Nov. 10, 2003

(51) Int. Cl.
*G06F 17/00* (2006.01)

(52) U.S. Cl. .................. 707/102; 707/101; 707/103 Y; 707/104.1; 707/202; 707/203; 707/204; 711/162

(58) Field of Classification Search .............. 707/1, 707/102, 202, 200, 204, 205, 206, 203, 101, 707/103 Y, 104.1; 711/100, 162; 714/21; 709/219
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |
| RE34,100 E | 10/1992 | Hartness |

(Continued)

FOREIGN PATENT DOCUMENTS

WO        WO 89/10594        11/1989

OTHER PUBLICATIONS

Michael nelson et al., "Caching in the Sprite Network File System", ACM, Nov. 1987, pp. 3-4.*

(Continued)

*Primary Examiner*—Thuy N Pardo
(74) *Attorney, Agent, or Firm*—Cesari and McKenna LLP

(57) ABSTRACT

A system and method for managing file data during consistency points in a file system is provided. A buffer data control structure is modified to include a flags array that tracks various status flags for both a current and a next consistency point (CP). By utilizing multiple pointers within a buffer control structure, the file system may permit write operations to continue to a file undergoing write allocation. Received writes during a write allocation procedure are stored in raw data buffers and the buffer control structure is marked as being dirty for a next CP.

15 Claims, 8 Drawing Sheets

U.S. PATENT DOCUMENTS

| | | | |
|---|---|---|---|
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,426,747 | A | 6/1995 | Weinreb et al. |
| 5,485,579 | A | 1/1996 | Hitz et al. |
| 5,511,177 | A | 4/1996 | Kagimasa et al. |
| 5,581,724 | A | 12/1996 | Belsan et al. |
| 5,764,972 | A | 6/1998 | Crouse et al. |
| 5,802,366 | A | 9/1998 | Row et al. |
| 5,819,292 | A * | 10/1998 | Hitz et al. .................. 707/203 |
| 5,828,876 | A | 10/1998 | Fish et al. |
| 5,832,513 | A * | 11/1998 | Kennedy .................... 707/202 |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,065,037 | A | 5/2000 | Hitz et al. |
| 6,128,627 | A * | 10/2000 | Mattis et al. ................ 707/202 |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 * | 5/2001 | Schneider et al. ............ 714/21 |
| 6,275,898 | B1 | 8/2001 | DeKoning |
| 6,397,311 | B1 | 5/2002 | Capps et al. |
| 6,425,035 | B2 | 7/2002 | Hoese et al. |
| 6,526,478 | B1 | 2/2003 | Kirby |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,732,124 | B1 * | 5/2004 | Koseki et al. ............... 707/202 |
| 6,804,706 | B2 * | 10/2004 | Pitts ........................... 709/219 |
| 2002/0049883 | A1 * | 4/2002 | Schneider et al. ........... 711/100 |
| 2002/0087500 | A1 * | 7/2002 | Berkowitz et al. ............. 707/1 |
| 2002/0091670 | A1 * | 7/2002 | Hitz et al. ...................... 707/1 |
| 2002/0112022 | A1 | 8/2002 | Kazar et al. |
| 2002/0116593 | A1 | 8/2002 | Kazar et al. |
| 2004/0064474 | A1 * | 4/2004 | Hitz et al. .................... 707/102 |
| 2004/0220961 | A1 * | 11/2004 | Lee et al. ..................... 707/102 |
| 2005/0071586 | A1 * | 3/2005 | Bartfai et al. ................ 711/162 |
| 2005/0097260 | A1 * | 5/2005 | McGovern et al. ........... 711/100 |
| 2006/0184587 | A1 * | 8/2006 | Federwisch et al. ......... 707/200 |

OTHER PUBLICATIONS

Suparna Bhattacharya et al., "Coordinating Backup/Recovery and Data Consistency between Database and File Systems", ACM, Jun. 2002, pp. 500-511.*

U.S. Appl. No. 10/215,917, filed Aug. 9, 2002, Pawlowski, et al, titled Multi-Protocol Storage Appliance That Provides Integrated Support for File and Block Access Protocols.

U.S. Appl. No. 10/027,634, filed Dec. 21, 2001, Edwards, et al., titled File System Defragmentation Technique Via Write Allocation.

U.S. Appl. No. 10/705,025, filed Nov. 10, 2003, Hamilton, et al., titled System and Method for Managing File Metadata During Consistency Points.

U.S. Appl. No. 10/705,470, Fair, et al., titled Method for Detecting Leaked Buffer Writes Across File System Consistency Points.

David Hitz et al., TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al., (1999) Request for Comments (RFC) 2616, HTTP/1.1.

Auspex Systems, LFS—A Local File System for Multiprocessor NFS Network Servers, 1994.

Unix Workstation System Administration Education Certification Course, Jan. 8, 2002.

Ron Lenive and Michelle Gervais, Building a SAN, SunExpert Magazine, Mar. 1999, pp. 50-64.

Network Appliance ends NAS-SAN war by Computerwire, http://www.theregister.co.uk/2002/10/102/network_appliance_ends_nassan_war/print.html, Published Wednesday, Oct. 2, 2002.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Lu, Y. "Performance Study of iSCSI-Based Storage Subsystems", IEEE Communications Magazine, pp. 76-82, Aug. 2003.

Celerra File Server Architecture for High Availability, EMC2 where information lives, Aug. 1999, pp. 1-7.

Callaghan B, "NFS Version 3 Protocol Specification", Request for Comments (RFC) 1813 Jun. 1995.

Asante Desktop EN/SC Adapters User's Manual Apr. 1996.

Asante EN/SC Adapter Family Installation Guide May 1994.

Maintenance Procedures ND (8C) nd-network disk control Feb. 1985.

Misc. Reference Manual Pages ND (4P) nd-network disk driver Jul. 26, 1985.

Performance Without Compromise: The Virtual Storage Architecture 1997.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, 39(12), Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Peformance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3):407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al., *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical Integrity in a large segmented database*, ACM Trans. Database Systems, 2(1): 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA: A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al., *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17):3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistant Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al., *Coda: A highly available file system for a distributed workstation environment* Carnegie Mellon University, CMU-ITC.

Satyanarayanan, M., et al., *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences. Univ. of CA, Berkeley, Oct. 1989.

Wittle, Mark, et al., *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Chaudhuri, Surajit, et al., *Self-Tuning Technology in Microsoft SQL Server*, Data Engineering Journal 22, Feb. 1999 pp. 20-27.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Kazar, Michael Leon, *Synchronization and Caching Issues in the Andrew File System*, Carnegie Mellon University, CMU-ITC-88-063.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Quinlan, Sean, *A Cached WORM File System*, Software-Practice and Experience, 21(12):1289-1299 1991.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992, pp. 1-93.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

SYSTEM AND METHOD FOR MANAGING FILE DATA DURING CONSISTENCY POINTS

RELATED APPLICATIONS

This application is related to the following United States patent applications:

U.S. patent application Ser. No. 10/705,025 entitled SYSTEM AND METHOD FOR MANAGING FILE METADATA DURING CONSISTENCY POINTS, by Eric Hamilton, et al., the contents of which are hereby incorporated by reference; and U.S. patent application Ser. No. 10/705,470 entitled METHOD FOR DETECTING LEAKED BUFFER WRITES ACROSS FILE SYSTEM CONSISTENCY POINTS, by Robert L. Fair, et al., the contents of which are hereby incorporated by reference.

FIELD OF THE INVENTION

The present invention relates to file systems and, more specifically, to managing file data during consistency points in a file system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a storage appliance is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available storage system (filer) implementations can serve a large number of discrete volumes (150 or more, for example).

Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL-based file system, a RAID 4 implementation is advantageously employed. This implementation specifically entails the striping of data across a group of disks, and separate parity storing within a selected disk of the RAID group. As described herein, a volume typically comprises at least one data disk and one associated parity disk (or possibly data/parity partitions in a single disk) arranged according to a RAID 4, or equivalent high-reliability, implementation.

A consistency point (CP) is a wholly consistent and up-to-date version of the file system that is typically written to disk or to other persistent storage media. In a system utilizing CPs, a CP of the file system is generated typically at regular time intervals. Thus, in the event of an error condition, only information written to files after the last CP occurred are lost or corrupted. If a journaling file system is utilized where write operations are "logged" (stored) before being committed to disk, the stored operations can be replayed to restore the file system "up to date" after a crash other error condition. In the example of a WAFL-based journaling file system, these CPs ensure that no information is lost in the event of a storage system crash or other error condition. CPs are further described in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which is hereby incorporated by reference.

In a CP-based file system, the on-disk copy of the file system is usually slightly "out of date" compared to the instantaneous state of the file system that is stored in a memory of the storage system. During the write allocation phase of a CP, the file system identifies all information that must appear in the CP and writes it to disk. Once this write operation completes, the on-disk copy of the file system reflects the state of the file system as of the CP. However, the time required to identify the information that must be written to disk in a given CP and to perform the actual write operation typically takes much longer than the time required for an individual file system operation to complete. Thus, a file system utilizing CPs typically halts or otherwise suspends write operations during the time required to perform write allocation during the CP. Under heavy loads involving large files, this time may be on the order of tens of seconds, which seriously impedes access latency for clients of the storage system. For example, a client will not receive an acknowledgement of a write request until such time as the CP has completed, thus causing some application programs executing on the client to generate error messages or suffer failures due to timeout conditions.

Additionally, system performance may be impaired due to increased latency resulting from a large number of incoming write operations that may be queued and suspended while the CP write allocation operation is performed. A database that issues many write operations to modify a file: is an example of a system that may suffer reduced performance because of the increased latency. A solution to this problem is to allow execution of write operations during an ongoing CP. However, such a solution requires that the storage system be able to identify and differentiate incoming information (i.e., write data and metadata) associated with both the modified file and the CP that the information is related thereto. For example, if a file is currently undergoing write allocation and an incoming write operation is received, the storage system must separate and differentiate the incoming information from the information currently being write allocated. If the storage system fails to differentiate properly between the two types of information, the file system, and more specifically, the file undergoing write allocation, may lose consistency and coherency, with an accompanying loss of information or an inability to access the stored information.

SUMMARY OF THE INVENTION

The disadvantages of the prior art are overcome by providing a system and method for managing write data served by a storage system during consistency points (CP) to thereby enable performance of write operations directed to a file currently involved in a CP. According to the illustrative embodiment, a per-file system, monotonically increasing consistency point counter is utilized to identify a current and next consistency point generated by the storage system. In particular, the consistency point counter is used to determine whether incoming write data should overwrite data currently existing in a data buffer or be written to a newly allocated data buffer. To that end, a "control" buffer data structure is provided that includes a two entry array that stores appropriate values or "states" of flags that correspond to the state for the current CP and for the next CP. The monotonically increasing consistency point counter is used to compute an index into the array to determine and select the appropriate state information for the control buffer.

The file data is stored in a data buffer associated with an inode of the file. When a write request is received at the storage system, the file system determines if the file is currently involved in a CP. If the file is currently involved in a CP, then a reference to the file data associated with the write request is saved in a data buffer and a flag is set in a control buffer data structure identifying that the file is "dirty" for the next CP. The file data is then committed to disk during the next CP. However, if the file is not currently involved in a CP, then the references to the file data stored in a data buffer and the control buffer data structure is marked identifying the file as being dirty for the current CP.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

When used in a SAN environment, a storage system may be embodied as a multi-protocol storage appliance having a storage operating system that implements a file system and provides for storage virtualization and support for virtual disks (vdisks). An example of a multi-protocol storage appliance that may be advantageously used with the present invention is described in co-pending and commonly assigned U.S. patent application Ser. No. 10/215,917 entitled A MULTI-PROTOCOL STORAGE APPLIANCE THAT PROVIDES INTEGRATED SUPPORT FOR FILE AND BLOCK ACCESS PROTOCOLS, by Brian Pawlowski, et al., which is hereby incorporated by reference as though fully set forth herein.

Figure 1:
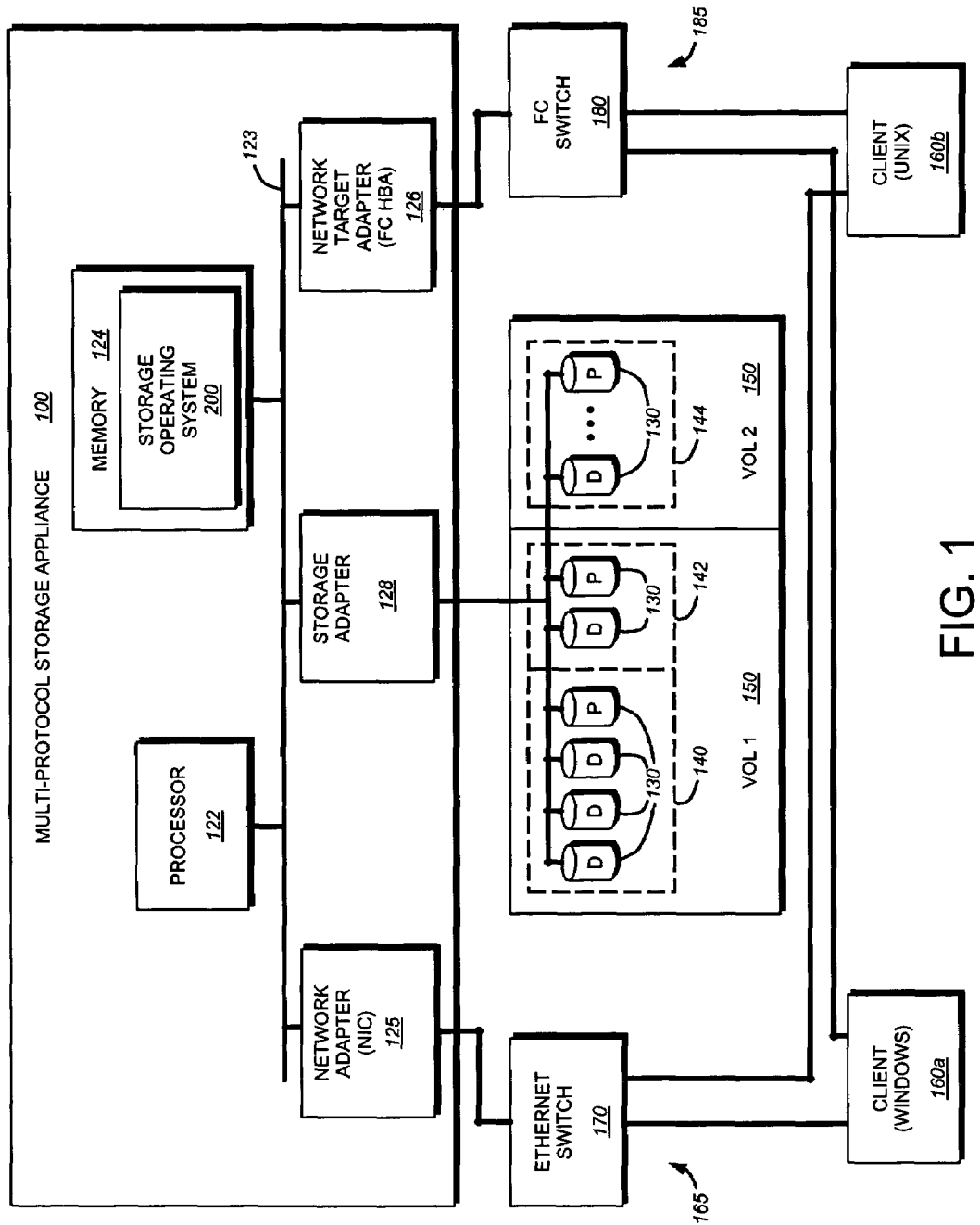
FIG. 1 is a schematic block diagram of an exemplary storage system network in accordance with an embodiment of the present invention.

FIG. 1 is a schematic block diagram of an illustrative storage appliance 100 that may be advantageously used with the present invention. The storage appliance is configured to provide storage service for both file and block protocol access to information stored on storage devices in an integrated manner. In this context, the storage appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

The clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over an NAS-based network. Therefore, each client 160 may request the services of the storage appliance 500 by issuing file access protocol messages (in the form of packets) to the appliance over the network 165. For example, a client 160*a* running the Windows operating system may communicate with the storage appliance 100 using the Common Internet File System (CIFS) protocol over TCP/IP. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 100 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section within the file system. An example of a stream inode object that may be advantageously used with the present invention is described in U.S. patent application Ser. No. 09/891,159 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

B. Storage Operating System

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein. The term "metadata" refers to data that is generated, stored and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data."

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
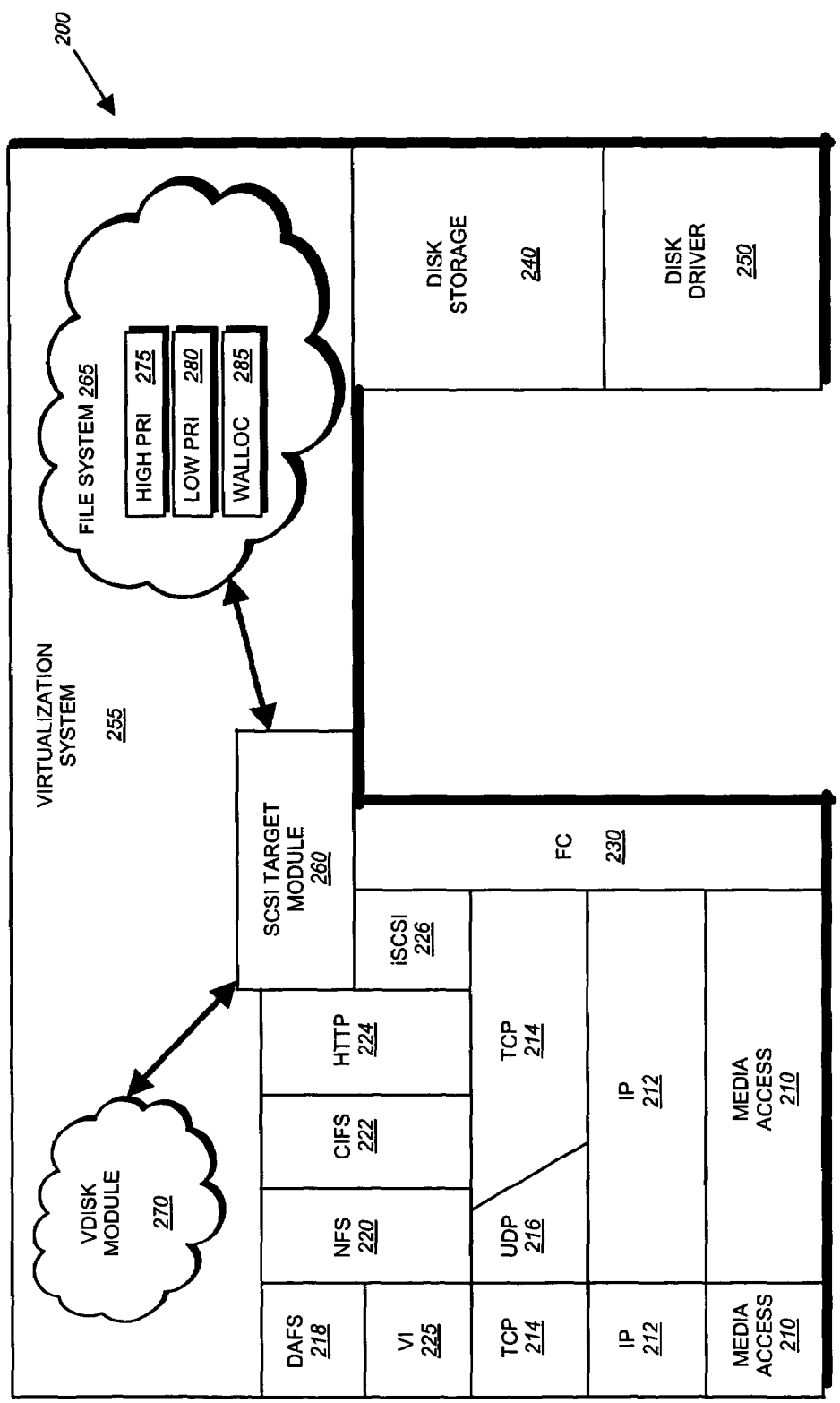
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 225 implements the VI architecture to provide direct access transport (DAT) capabilities, such as RDMA, as required by the DAFS protocol 218.

An iSCSI driver layer 226 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the multi-protocol storage appliance 100. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 226 and the file system 265 to thereby provide a translation layer of the virtualization system 255 between the SAN block (lun) space and the file system space, where luns are represented as vdisks. By "disposing" SAN virtualization over the file system 265, the multi-protocol storage appliance reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the above-incorporated U.S. Pat. No. 5,819,292.

SAN clients typically identify and address disks by logical numbers or luns. However, the automated storage virtualization technique allows system administrators to manage vdisks and their addressing by logical names. To that end, the vdisk module 270 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization technique addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

Included within the file system 265 is a set of processes, including HighPri 275, LowPri 280 and WALLOC 285 that perform various file system operations. HighPri and LowPri perform identical functions with the only difference being the priority level at which they run. These two basic file system processes (HighPri 275 and LowPri 280) perform the work of the file system layer, e.g., loading blocks into a buffer cache, setting dirty bits to the blocks and acquiring blocks to be cleaned and/or write allocated. The HighPri and LowPri processes are further described in U.S. patent application Ser. No. 10/027,634, entitled FILE SYSTEM DEFRAGMENTATION TECHNIQUE VIA WRITE ALLOCATION, John K. Edwards, et al., the contents of which are hereby incorporated by reference as though fully set forth herein.

The WALLOC process 285, described further below, implements the novel system and method for managing file data during consistency points. In accordance with the illustrative embodiment of the present invention, the WALLOC process 285 performs all write allocation operations to ensure smooth consistency point (CP) data flow. Specifically, WALLOC creates and manages file data structures to ensure that the proper file data is associated with both the current CP and with the next CP for each file.

C. Inodes and Buffer Trees

In the example of the illustrative WAFL file system, a file is represented as an inode data structure adapted for storage on disks. Broadly stated, the on-disk format representation of the exemplary WAFL file system is block based using, e.g., 4-kilobyte (KB) blocks and using inodes to describe the files. An inode is a data structure used to store information, such as metadata, about the file. That is, the information contained in an inode may include, e.g., ownership of the file, access permission for the file, size of the file, or other attributes, described further below. The WAFL file system uses a file handle, i.e., an identifier that includes an inode number, to retrieve an inode from disk. The exemplary WAFL file system also uses files to store metadata describing the layout of its file system. These metadata files include, among others, an inode file. The on-disk format structure of the WAFL file system, including inodes and the inode file, is disclosed and described in the above-incorporated U.S. Pat. No. 5,819,292.

Figure 3:
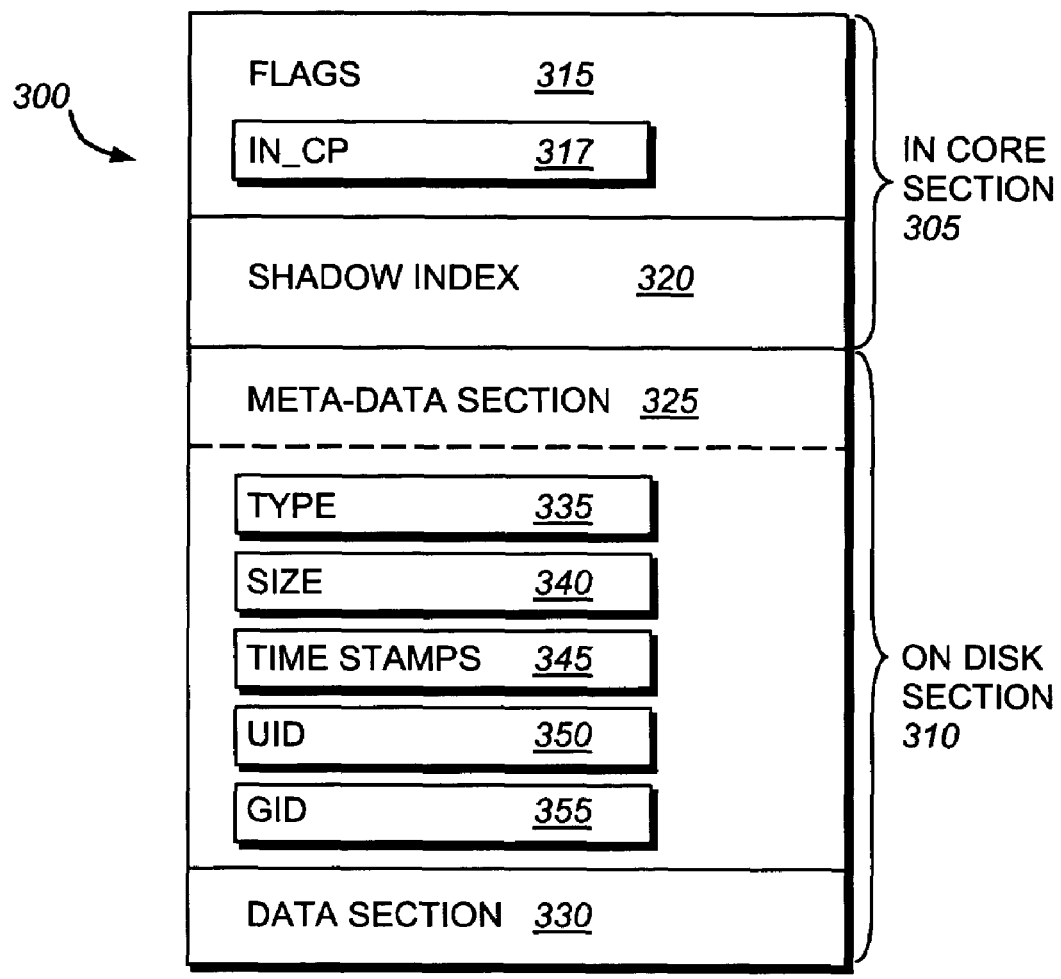
FIG. 3 is a schematic block diagram of an exemplary inode data structure in accordance with an embodiment of the present invention.

FIG. 3 is a schematic block diagram illustrating an exemplary inode 300, which preferably includes an in-core section 305 and on-disk section 310. In accordance with the illustrative embodiment, both the in-core section 305 and the on-disk section 310 are stored in memory; however, only the on-disk section 310 is written to disk during a consistency point. The in-core section 305 comprises a flags section 315 and a shadow index 320. The flag section 315, in turn, comprises a variety of flags including, for example, an IN_CP flag 317 that is set by the file system when the inode is actively modified during a CP write allocation phase. File system processes may, by examining the IN_CP flag, determine whether the inode is currently undergoing write allocation during a CP. The shadow index 320 is, in the illustrative embodiment, a two-byte value that serves as an index to a shadow data entry, which stores shadow or frozen state information when write operations are directed to an inode while it is being modified during a CP. Shadow indices are further described in the above-incorporated U.S. patent application entitled SYSTEM AND METHOD FOR MANAGING FILE METADATA DURING CONSISTENCY POINTS.

The on-disk section 310 illustratively includes a metadata section 325 and a data section 330. The information stored in the metadata section 325 of each inode 300 describes the file and, as such, includes the type (e.g., regular or directory) 335 of file, the size 340 of the file, time stamps (e.g., access and/or modification) 345 for the file and ownership, i.e., user identifier (UID 350) and group ID (GID 355), of the file. The contents of the data section 330 of each inode, however, may be interpreted differently depending upon the type of file (inode) defined within the type field 335. For example, the data section 330 of a directory inode contains metadata controlled by the file system, whereas the data section of a regular inode contains user-defined data. In this latter case, the data section 330 includes a representation of the data associated with the file.

Specifically, the data section 330 of a regular on-disk inode may include user data or pointers, the latter referencing 4 KB data blocks on disk used to store the user data. Each pointer is preferably a logical volume block number to thereby facilitate efficiency among the file system when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kilobytes (KB), then the data section of the inode comprises up to 16 pointers, each of which references a 4 KB block of data on the disk. Moreover, if the size of the data is greater than 64 kilobytes but less than or equal to 64 megabytes (MB), then each pointer in the data section 150 of the inode references an indirect inode that contains 1024 pointers, each of which references a 4 KB data block on disk. In addition, the size field 340 of the metadata section 325 of the inode refers to the size of the file.

Figure 4:
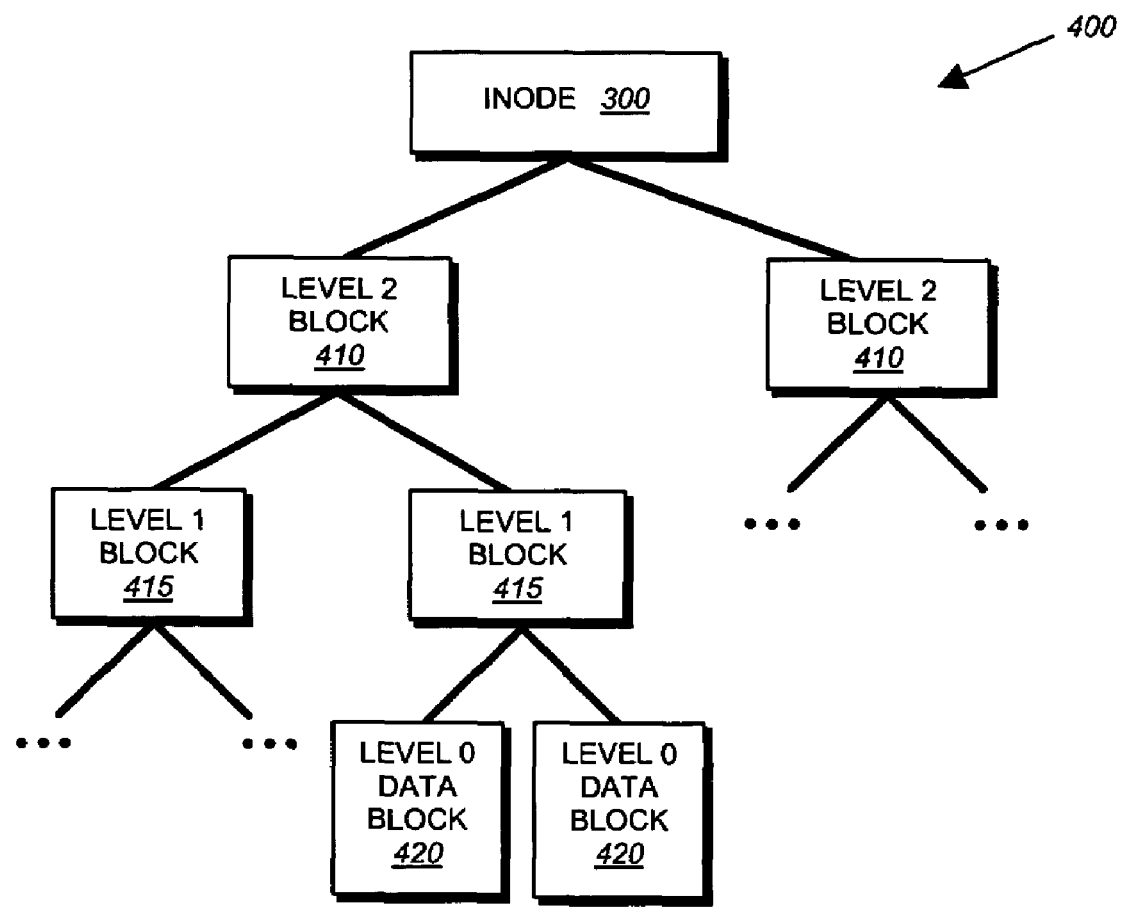
FIG. 4 is a schematic block diagram of an exemplary buffer tree inode data structure in accordance with an embodiment of the present invention.

An exemplary buffer tree 400 is shown in FIG. 4. Buffer trees are utilized by the file system to store data corresponding to a file. The root of the buffer tree 400 is an inode 300 that is utilized to store various metadata associated with the file. The inode 300, described above in reference to FIG. 3, contains pointers to various level 2 blocks 410. Each level 2 block, in turn, contains one or more pointers to level 1 blocks 415 and each level 1 block 415 contains one or more pointers to level 0 data blocks 420. The level 1 and level 2 blocks 410 and 415 are intermediate inodes that store pointers to lower level blocks. In the illustrative embodiment, each intermediate block may contain pointers of up to 1024 lower level blocks. In the illustrative embodiment of the WAFL-based file system, each level 0 data block 420 stores 4 KB of data.

D. File Data During Consistency Points

Figure 5:
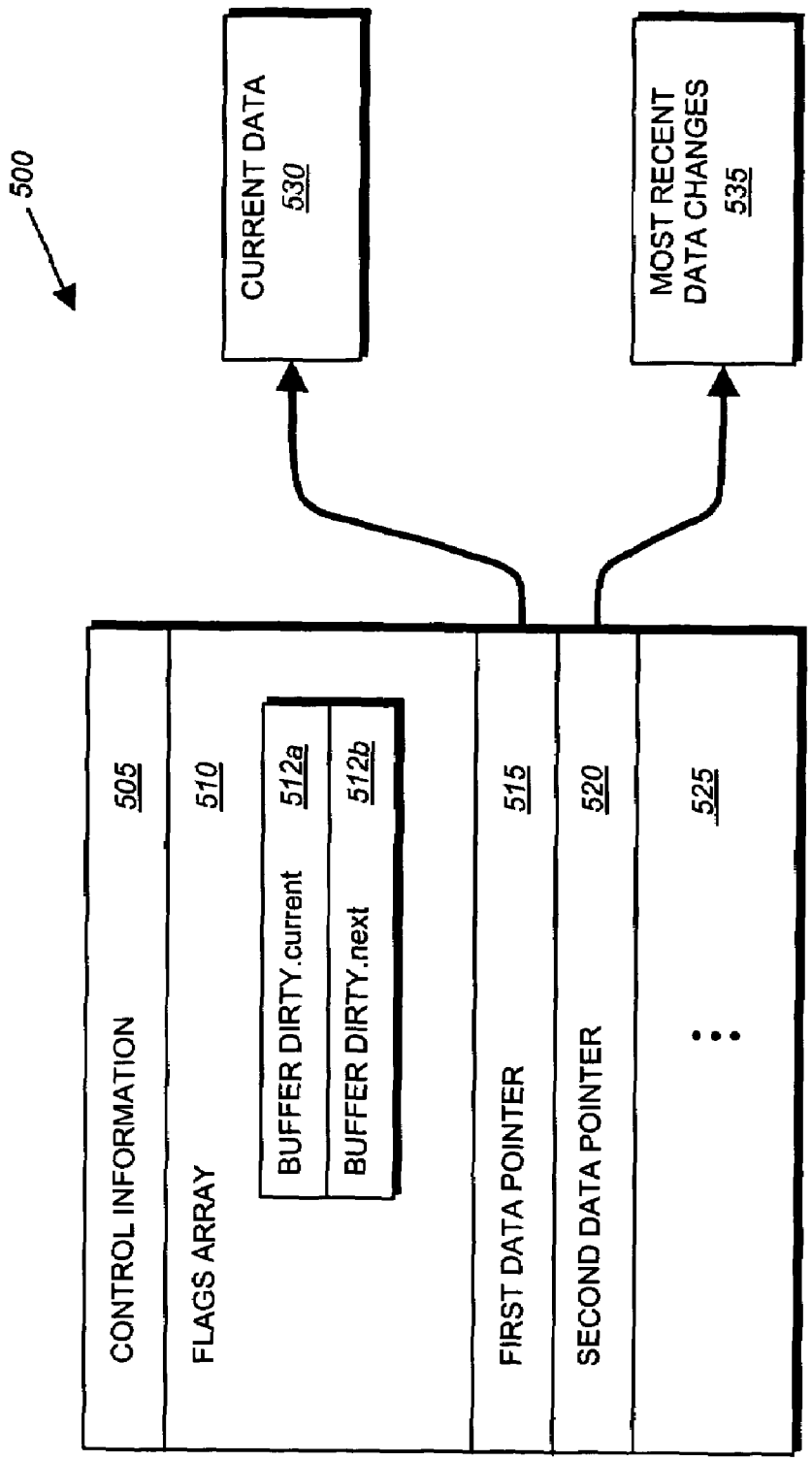
FIG. 5 is a schematic block diagram of an exemplary buffer data structure in accordance with an embodiment of the present invention.

In memory 124 of storage appliance 100, each data block is represented by a control buffer data structure containing pointers to raw write data received from write operations. The control buffer data structure includes various metadata used for managing (tracking) the changes to the buffer, including, for example whether the buffer has been "dirtied" by having write operations directed to it. An exemplary buffer data structure 500 is shown in FIG. 5. The data structure 500 illustratively includes control information 505, a flags array 510, a first data pointer 515 and a second data pointer 520 along with additional fields 525. The control information 505 may include, for example various flags that are not CP dependant. That is, flags do not need to be duplicated to ensure that proper data is written out during a consistency point, as they are the same during any consistency point. Assertion of these control information flags may occur in certain special files, such as those utilized to store file system metadata. The novel flags array 510 includes two entries of flags associated with the buffer control structure. The storage operating system utilizes the two entry array to store appropriate flag values ("states) for the "current" CP and for the "next" CP. Included within this flags array is a BUFFERDIRTY flag 512 that identifies whether the buffer is dirty. As used herein, the term "BUFFERDIRTY.current" represents the value of the BUFFERDIRTY flag for the current CP, whereas, "BUFFERDIRTY.next" represents the value of the flag for the next CP.

Figure 6:
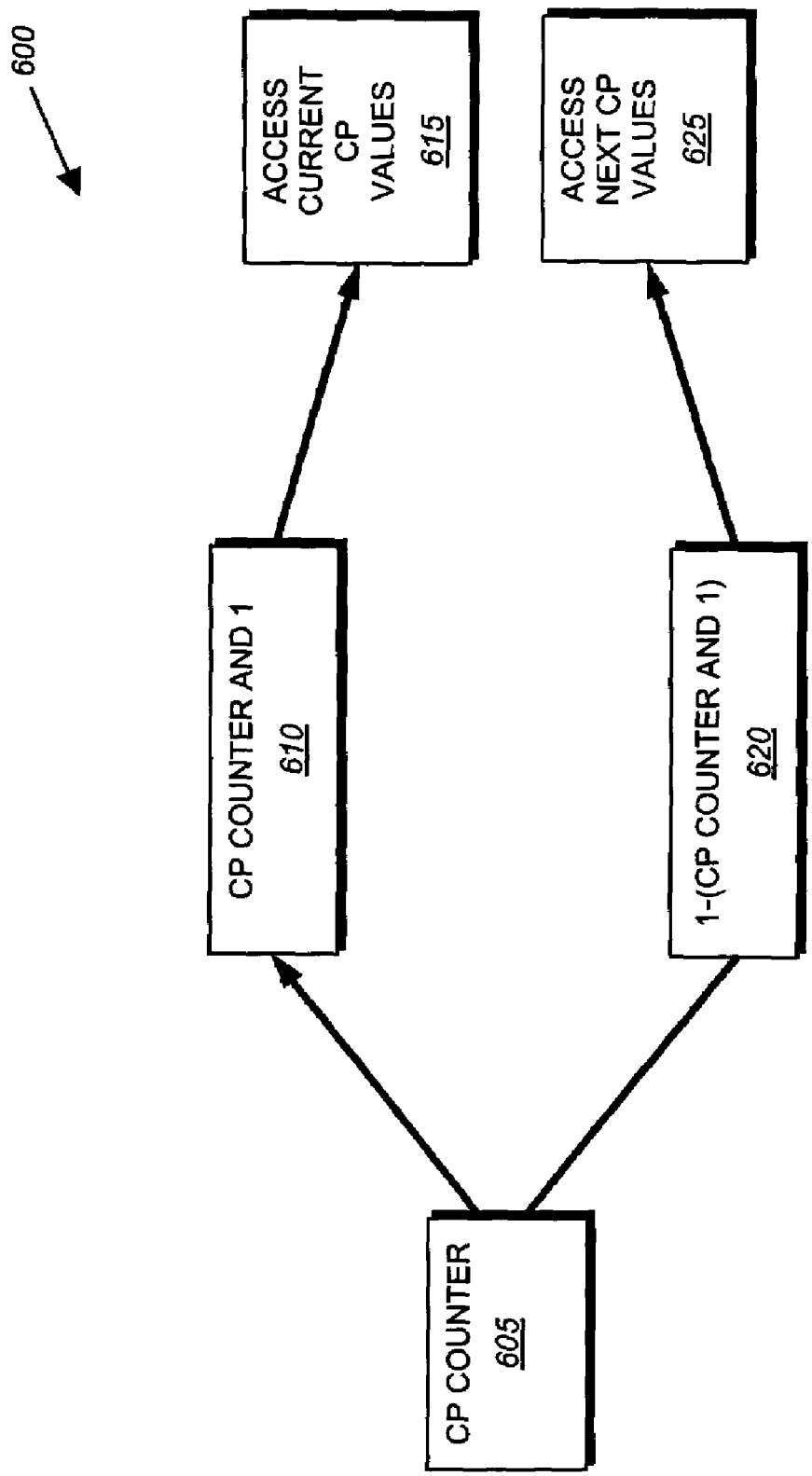
FIG. 6 is a functional diagram of the use of a CP counter to identify current CP and next CP flag entries.

To track the flag states in the flags array 510, the storage operating system uses, in the exemplary embodiment, a monotonically increasing CP counter to identify the current CP, which is the current value of the CP counter, and the next CP, which is the value of the CP counter plus 1. FIG. 6 is an illustrative functional diagram of the use of the CP counter to identify the current CP and/or next CP. To illustratively implement this tracking technique, the monotonically increasing CP counter 605 utilizes modulo-two arithmetic. The value of [CP Counter AND 1] (step 610) where AND represents a logical bitwise operation permits the storage operating system to access the current CP values 615. The result of this operation will be either a value of 0 or 1. Similarly, the next CP entry may be accessed 625 by referring to the array entry calculated from [1−(CP Counter AND 1)] (step 620). By using this illustrative technique, the two entries in the flags array alternate between representing the current and next CP as the CP counter increases.

The first data pointer 515 and second data pointer 520 reference (point to) the location of current data 530 associated with the current CP and the most recent data changes 535 to be included in the next CP, respectively. Note that the references to locations of the current data 530 and the most recent data changes 535 are illustratively locations in memory 124.

Figure 7:
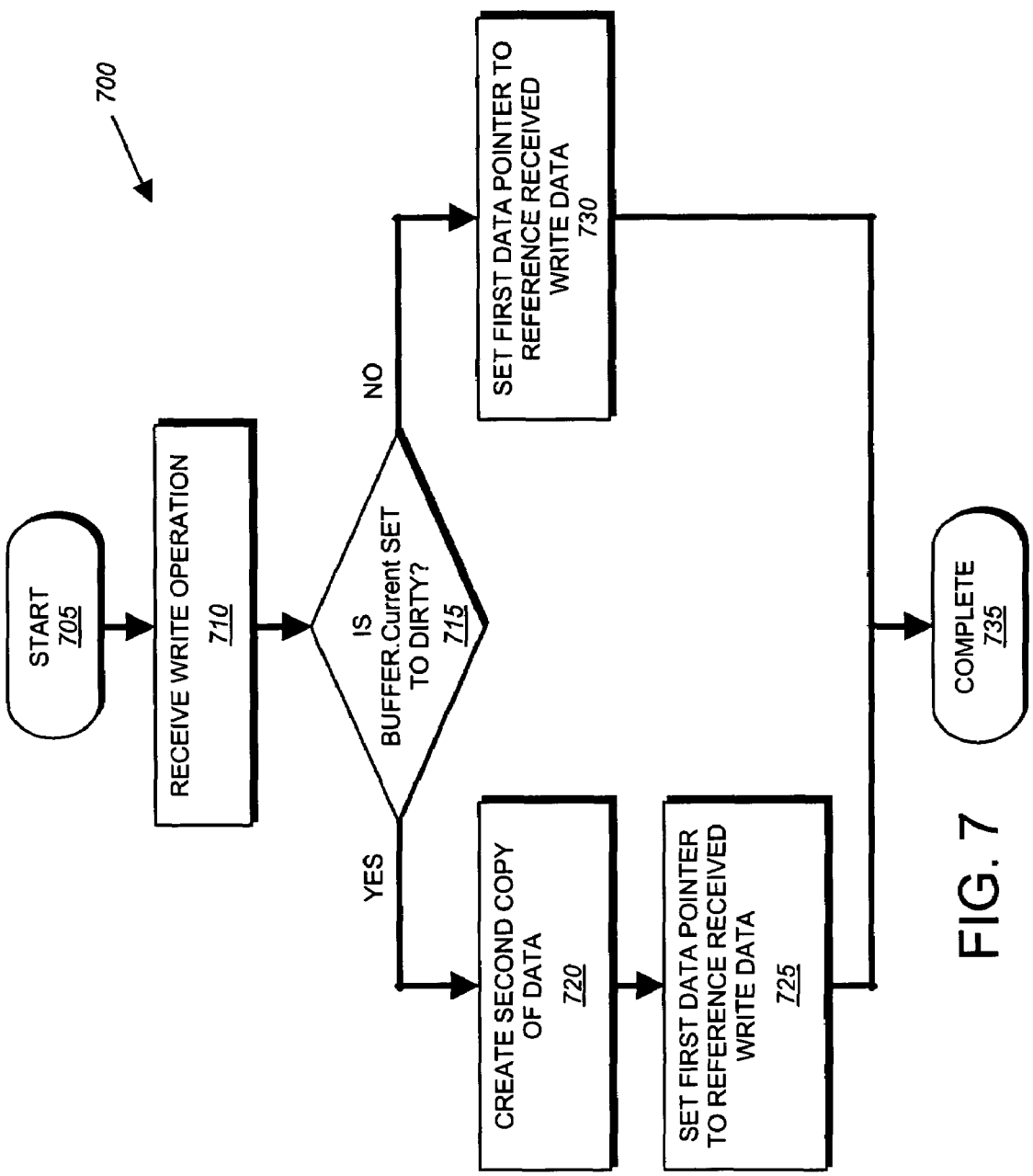
FIG. 7 is a flowchart detailing the steps of a procedure for processing write operations in accordance with an embodiment of the present invention.

An exemplary procedure 700 performed by the storage operating system 200 in processing write operations is shown in FIG. 7. The procedure begins in step 705 and proceeds to step 710 where a write operation is received at the storage system 100. This write operation is directed to a file serviced by the storage system executing the storage operating system and implementing the teachings of the present invention. After receiving the write operation, the storage operating system determines, in step 715, whether the BUFFERDIRTY.Current flag is set. This determines whether the procedure 700 will need to utilize the second data pointer or not.

If the BUFFERDIRTY.Current flag is not set, the procedure branches to step 730 and sets the first data pointer on the buffer 500 to reference the received write data. This occurs when, for example, no writes have been directed to the buffer since the last CP. The procedure is then complete (step 735).

However, if the BUFFERDIRTY.Current flag is set, then data has been received for the current CP and the procedure branches to step 720, where a second copy of the stored data is made. This second copy is pointed to by the second data pointer in buffer 500. During a consistency point, this data, referenced by the second data pointer, is written to disk as it represents all received writes before the CP counter was incremented. Then, in step 725, the first data pointer is set to reference the newly received write data. The first data pointer is utilized to respond to read operations, as the first data pointer references the most recently received write data. The procedure is then complete in step 735.

Figure 8:
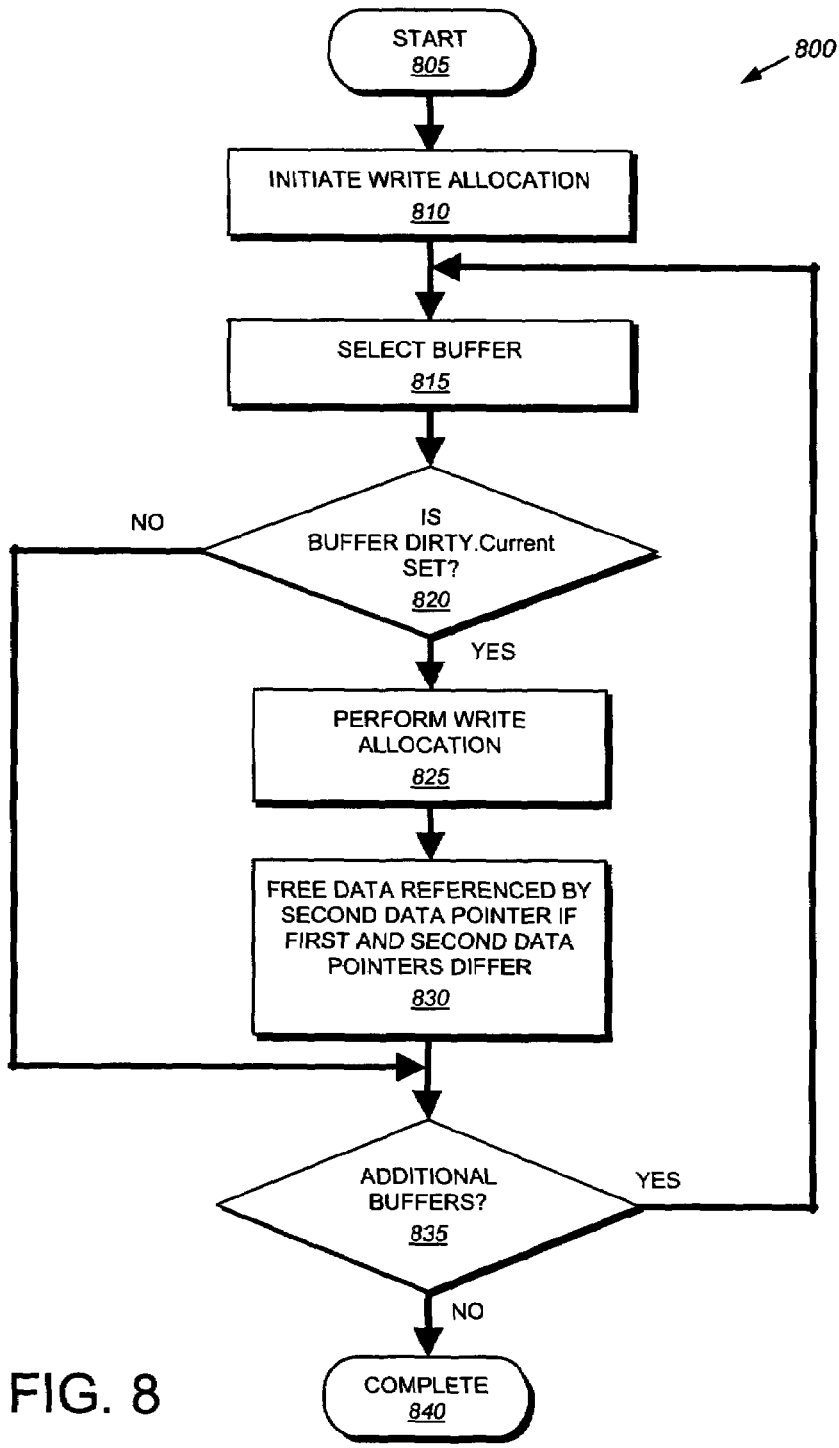
FIG. 8 is a flowchart detailing the steps of a procedure for performing write allocation in accordance with an embodiment of the present invention.

A procedure 800 for performing write allocation of a dirty buffer in accordance with the illustrative embodiment in the present invention is shown in FIG. 8. The procedure 800 begins in step 805 and proceeds to step 810 where write allocation of a data buffer initiated by e.g., conventional file system mechanisms operating to implement a CP. Note that the CP may be generated because, for example, a predetermined time period may have elapsed since the last CP or the amount of available memory in the storage system has been reduced to a level where the CP is needed to "free up" memory space to allow continued buffering of write operations. In the illustrative embodiment, the CP counter is incremented at the beginning of the write allocation in step 810. Thus, when the CP counter is incremented, all data associated with the next CP becomes associated with the current CP.

The procedure continues to step 815 where a buffer is selected for write allocation. Then, in step 820, the buffer is examined to determine if the BUFFERDIRTY.Current flag is set, signifying that the buffer is dirty for the current CP and needs to be write allocated. If the BUFFERDIRTY.Current flag is set, the procedure branches to step 825 where write allocation is performed on the buffer. Write allocation in this context includes, inter alia, writing the contents of the data buffer to disk in accordance with a predetermined file system implementation.

As the write allocation completes for each buffer, the procedure, in step 830, frees the data referenced by the second data pointer in the buffer if the first and second data pointers differ. If the first and second data pointers differ, then the first data pointer will reference the most current data, i.e. the data for the next CP, while the second data pointer references the data that was just written to disk during the write allocation operation. Thus, if the two pointers differ, the data reference by the second pointer is no longer needed once the data has been committed to disk (in step 825).

The procedure then determines if there are additional buffers that need to be write allocated in step 835. If there are no more buffers to write allocate, the procedure is complete in step 840. Otherwise, if there are additional buffers, the procedure branches back to step 815 to select another buffer.

If the procedure determines that the BUFFERDIRTY.Current flag is not set in step 820, the procedure branches to step 835 and determines if there are additional buffers that need to be write allocated. If there are additional buffers to be write allocated, the procedure loops back to step 815 to select another buffer. Otherwise, the procedure is complete in step 840.

To again summarize, the present invention is directed to a system and method for managing file data in a file system utilizing multiple consistency points to permit write operations directed to a file while the file is involved in a write allocation consistency point. In accordance with the illustrative embodiment of the invention, a buffer data control structure includes a flags array having entries that store flag states for both the current CP and the next CP. These flag states are accessed using a monatomically increasing CP counter. By performing a logical operation on the CP counter the two flag entries of the flags array continue to exchange their roles of serving as the flags for the current CP and for the next CP. When write data is received for a file, the data is written to a next CP buffer if the file is currently involved in a write allocation procedure. This next CP buffer and associated flag states within the flags array are then set to signify that the next CP data buffer is dirty.

During the write allocation procedure, a determination is made if the data buffer is dirty for the next CP. If the buffer is dirty for the next CP, the procedure updates the appropriate pointers at the conclusion of the write allocation process for the current CP. These pointers include, for example, a pointer to the location in memory where the data for the next (or now current CP) data is stored.

The foregoing has been a detailed description of the illustrative embodiment of the present invention. There is modifications and additions can be made without departing from the spirit and scope of the invention. Additionally, while this description has been written with reference to storage appliances and file servers, the principles are equally pertinent to all types of computers. Furthermore, it is expressly contemplated that the teachings of this invention can be implemented as software, including a computer-readable media having program instructions executing on a computer, hardware, firmware, or a combination thereof. Accordingly this description is to be taken only by way of example and not to otherwise limit the scope of the invention.

What is claimed is:

1. A computer implemented method for managing a file system, comprising:
   receiving data directed to the file system;
   labeling the data as belonging to a current consistency point or to a next consistency point;
   allocating disk space for data belonging to the current consistency point, and not allocating disk space for data belonging to the next consistency point;
   selecting a time for writing the current consistency point to persistent storage;

locating buffer data which has been written to a buffer but which has not been written to persistent storage before the time selected for writing the current consistency point; and capturing the buffer data into the current consistency point.

2. The method of claim 1 further comprising:

locating buffer data which has been written to a buffer after the time selected for writing the current consistency point; and capturing the buffer data into the next consistency point.

3. The method of claim 1 further comprising:

maintaining a flags array in a buffer data control structure, the flags array having entries associated with the current consistency point and with the next consistency point.

4. The method of claim 3 further comprising:

using a monotonically increasing consistency point (CP) counter to identify the current CP as the current value of the CP counter, and the next CP as the value of the CP counter plus 1.

5. The method of claim 1 further comprising:

associating the received data with a buffer data control structure by setting a pointer in the buffer data control structure to a memory location associated with the received data.

6. The method of claim 1 further comprising:

differentiating entries associated with the current consistency point and the next consistency point by performing modulo two addition to a consistency point counter.

7. A computer implemented method for managing a file system, comprising:

receiving data directed to the file system;

labeling the data as belonging to a current consistency point or to a next consistency point; and allocating disk space for data belonging to the current consistency point, and not allocating disk space for data belonging to the next consistency point;

maintaining a flags array in a buffer data control structure, the flags array having entries associated with the current consistency point and with the next consistency point;

using a monotonically increasing consistency point (CP) counter to identify the current CP as the current value of the CP counter, and the next CP as the value of the CP counter plus 1;

utilizing modulo-two arithmetic with the CP counter to perform an AND operation using "CP AND 1" to obtain a first value of 0 or 1; and utilizing modulo-two arithmetic with the CP counter to perform an AND operation using "1−(CP AND 1)" to obtain a second value of 0 or 1, to produce flag values alternating between values of "0" and "1" to represent current and next consistency points.

8. The method of claim 5 further comprising:

marking the buffer data control structure as being dirty for a next consistency point by setting a flag in a flags array of the buffer data control structure.

9. A computer implemented file system, comprising:

a network adapter to receive data directed to the file system;

an operating system to label the data as belonging to a current consistency point or to a next consistency point; and a storage adapter to allocate disk space for data belonging to the current consistency point, and not allocating disk space for data belonging to the next consistency point;

a processor to select a time for writing the current consistency point to persistent storage;

buffer data which has been written to a buffer but which has not been written to persistent storage before the time selected for writing the current consistency point; and the operating system to capture the buffer data into the current consistency point.

10. The system of claim 9 further comprising:

a flags array in a buffer data control structure, the flags array having entries associated with a current consistency point and with the next consistency point.

11. The system of claim 10 further comprising:

a monotonically increasing consistency point (CP) counter to identify the current CP as the current value of the CP counter, and the next CP as the value of the CP counter plus 1.

12. The system of claim 9 further comprising:

the operating system to associate the received data with a buffer data control structure by setting a pointer in the buffer data control structure to a memory location associated with the received data.

13. The system of claim 12 further comprising:

the operating system to mark the buffer data control structure as being dirty for a next consistency point by setting a flag in a flags array of the buffer data control structure.

14. The system of claim 9 further comprising:

the operating system to differentiate entries associated with the current consistency point and the next consistency point by performing modulo two addition to a consistency point counter.

15. A computer implemented file system, comprising:

a network adapter to receive data directed to the file system;

an operating system to label the data as belonging to a current consistency point or to a next consistency point; and a storage adapter to allocate disk space for data belonging to the current consistency point, and not allocating disk space for data belonging to the next consistency point;

a flags array in a buffer data control structure, the flags array having entries associated with a current consistency point and with the next consistency point;

a monotonically increasing consistency point (CP) counter to identify the current CP as the current value of the CP counter, and the next CP as the value of the CP counter plus 1;

a modulo-two arithmetic with the CP counter to perform an AND operation using "CP AND 1" to obtain a first value of 0 or 1; and the modulo-two arithmetic with the CP counter to perform an AND operation using "1−(CP AND 1)" to obtain a second value of 0 or 1, to produce flag values alternating between values of "0" and "1" to represent current and next consistency points.

* * * * *